April 30, 1940.  J. W. PATTISON  2,198,883

VEHICLE WHEEL

Filed Sept. 14, 1936

INVENTOR
JAMES W. PATTISON
BY
ATTORNEYS

Patented Apr. 30, 1940

2,198,883

UNITED STATES PATENT OFFICE 2,198,883

VEHICLE WHEEL

James W. Pattison, Detroit, Mich., assignor to Kelsey-Hayes Wheel Company, Detroit, Mich., a corporation of Delaware Application September 14, 1936, Serial No. 100,785

2 Claims. (Cl. 301—63)

The invention relates to vehicle wheels and refers more particularly to that type in which the wheel body is formed of a disc.

The invention has for its main object to so construct the wheel body disc that it provides angularly spaced openings adjacent the tire carrying rim for the passage between the disc and rim of detachable auxiliary tread members which encircle the tire and rim. The invention has for another object to so construct the disc with reference to the rim that the wheel as viewed from the outboard side appears substantially to be solid.

The invention has for these as well as other objects the novel arrangements and combinations of parts as more fully hereinafter set forth.

Figure 2:
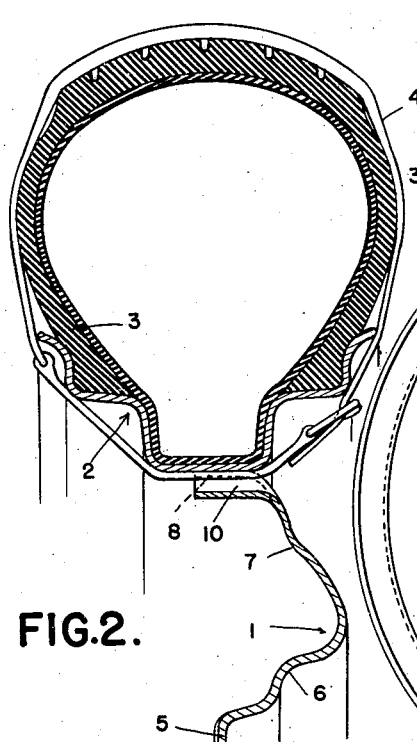
Figure 2 is a cross section on the line 2—2 of Figure 1.
Figure 1:
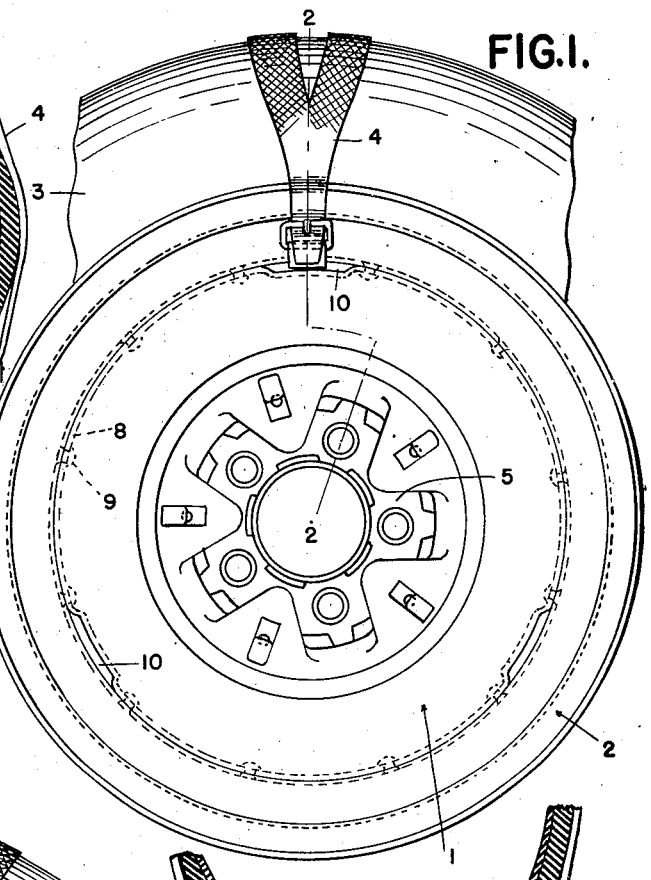
Figure 1 is an outboard or front elevation of a vehicle wheel showing an embodiment of my invention.

Referring to the embodiment of my invention shown in Figures 1 and 2, the wheel has the wheel body 1 and the tire carrying rim 2 mounted upon the periphery of the wheel body. 3 is the tire upon the rim and 4 are the auxiliary tread members which may be formed in any usual manner and which are adapted to be detachably secured in place to encircle the tire and rim.

The wheel body is a stamped sheet metal disc having the radially extending bolting-on flange 5, the annular portion 6 which extends generally axially in an outboard direction or toward the front side of the wheel from the periphery of the bolting-on flange and the generally radially outer portion 7 which extends from the outboard end of the annular portion and has at its periphery the axially extending continuous flange 8. The rim, as shown, is of the drop-center type and has the base of its well mounted upon the peripheral flange 8 and fixedly secured thereto by suitable means, such as the rivets 9.

To provide for the attachment of the auxiliary tread members 4 and at the same time to give the appearance of a substantially solid wheel from the outboard or front side thereof, I have formed angularly spaced recesses in the periphery of the wheel body disc for the passage between the disc and rim of these auxiliary tread members. These recesses are formed by pressing the flange 8 radially inwardly in angularly spaced zones to provide peripherally extending openings 10 which are relatively narrow radially of the wheel, but are of sufficient size to permit the passage therethrough of the strap portions of the auxiliary tread members. Another advantage obtained by reason of this construction is that of locating the buckles of the tread members within the rim and adjacent to its well.

Figure 3:
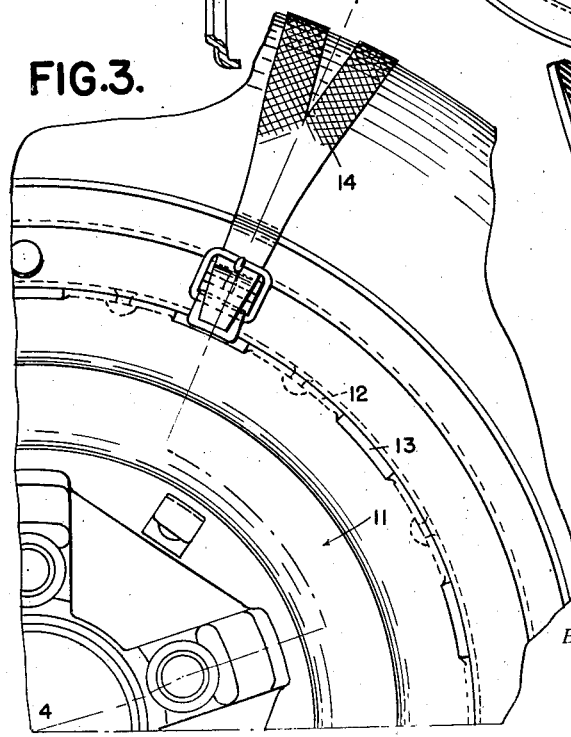
Figure 3 is a view similar to Figure 1 showing another embodiment of my invention.
Figure 4:
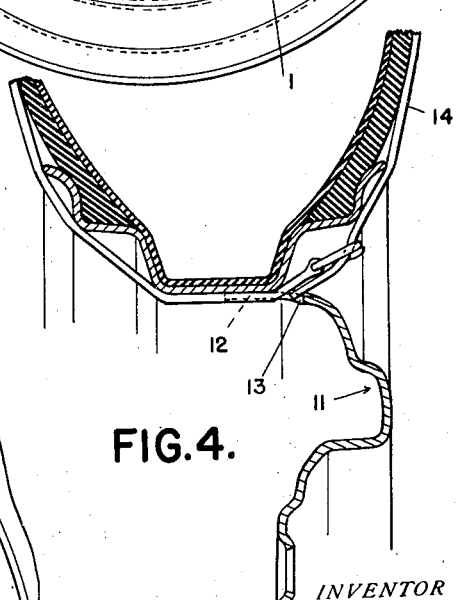
Figure 4 is a cross section on the line 4—4 of Figure 3.

In the modification illustrated in Figures 3 and 4, the construction of parts is very similar to that illustrated in Figures 1 and 2, with the exception that the wheel body disc 11 has at its periphery the angularly spaced axially extending tongues 12 upon which the rim is mounted and to which the base of the rim is secured as by means of rivets. These tongues are connected to the body portion of the disc in an outboard direction axially beyond the base of the rim to provide the angularly spaced openings 13 for the passage therethrough of the straps of the auxiliary tread members 14. It will be noted that the openings 13 are formed in substantially axial portions of the wheel body disc and, as a result, they are not appreciably noticeable from the outboard or front side of the wheel.

What I claim as my invention is:

1. In a vehicle wheel, the combination of a tire, a rim carrying said tire and a wheel body disc having angularly spaced axially extending tongues at its periphery upon which said rim is mounted and to which the base of said rim is secured, said tongues being connected to the body portion of the disc axially beyond the rim base to provide openings between the body portion of the disc and the rim base which are relatively narrow in an axial direction, said openings having the major portions thereof invisible from the outboard side of the wheel and being normally unobstructed to permit the passage therethrough of the flexible strap portions of detachable auxiliary tread members encircling said tire and rim.

2. In a vehicle wheel, the combination of a tire, a rim carrying said tire and a wheel body disc supporting said rim, said wheel body disc comprising a generally radially extending body portion and a generally axially extending peripheral portion adapted to be secured to the base of the rim and extending axially outwardly beyond the extremity of the base of the rim and connecting into said radially extending body portion, the portion of the axially extending peripheral flange located outwardly beyond the base of the rim having openings therein which extend circumferentially of the wheel disc and are relatively narrow in an axial direction, said openings having the major portions thereof invisible from the outboard side of the wheel and being normally unobstructed to permit the passage therethrough of the flexible strap portions of detachable auxiliary tread members encircling said tire and rim.

JAMES W. PATTISON.